United States Patent [19]

Kashio

[11] 3,827,028

[45] July 30, 1974

[54] CONTROL MEANS FOR INFORMATION STORAGE IN A DYNAMIC SHIFT MEMORY

[75] Inventor: Toshio Kashio, Tokyo, Japan

[73] Assignee: Casio Computer Co., Ltd., Tokyo, Japan

[22] Filed: June 1, 1972

[21] Appl. No.: 258,762

[30] Foreign Application Priority Data

July 26, 1971 Japan ................................ 46-55264

[52] U.S. Cl. ........................ 340/172.5, 340/174 SR

[51] Int. Cl. ............................................. G06f 3/00

[58] Field of Search ........ 340/172.5, 174 SR, 174 A

[56] References Cited

UNITED STATES PATENTS

| | | | |
|---|---|---|---|
| 2,978,680 | 4/1961 | Schulte, Jr. | 340/172.5 |
| 3,351,917 | 11/1967 | Shimabukuro | 340/172.5 |
| 3,539,997 | 11/1970 | Mahoney | 340/172.5 |
| 3,575,554 | 4/1971 | Schmidt | 340/172.5 |
| 3,737,577 | 6/1973 | Birkin | 340/172.5 X |

*Primary Examiner*—Harvey E. Springborn
*Attorney, Agent, or Firm*—Flynn & Frishauf

[57] ABSTRACT

A dynamic shift memory means includes a plurality of serially connected memory units, some of the serially connected memory units selectively storing one character of information. The arrangement includes various means for signifying whether character information is to be stored in the memory means or is to be read out of the memory means and for controlling the shifting process without requiring additional means for generating timing signals, thus simplifying the resultant arrangement.

16 Claims, 56 Drawing Figures

CONTROL MEANS FOR INFORMATION STORAGE IN A DYNAMIC SHIFT MEMORY

This invention relates to a memory register for storing in series a plurality of characters constituting information.

BACKGROUND OF THE INVENTION

In a hitherto-known dynamic shift memory, information is written into the memory after the so-called "carry" is made, thereby to store in the memory a new character. Such a memory is shown, for example, in U.S. Pat. No. 3,523,284, issued Aug. 4, 1970.

For example, in a dynamic shift memory whose contents are shifted by shift pulses, the first character of the contents of the memory is shifted to make it possible to write in or store a new character at the input side of the memory.

In one conventional dynamic shift memory, the first character of the memory contents is shifted from the output side to the input side of the memory with a one character delay. During the delay the new character is stored in the unit with such a timing that the first character of the information is simultaneously shifted to the input side of the memory. That is, during said delay no shift pulse is generated so that the dynamic shift memory may not shift any character it stores.

In such a dynamic shift memory, a new character of information may be written in another manner. Namely, once the first character information is shifted to the input side, one or more shift pulses are supplied, thereby to make one or more character places empty. Into such emptied places a new character is stored.

For a successful write-in operation of new characters, the conventional dynamic shift memory should be supplied with two timing signals — a "character" signal (usually called a "carry signal") denoting the time necessary for the memory contents to take a round trip and a control signal (generated during said time) for directing the input information to the proper location in the memory system. Said timing signals are time-related with the shift pulses, and a timing counter is therefore indispensable to the memory of this type.

The present invention aims to control character information storing in a dynamic shift memory, and particularly to provide an apparatus for controlling character information storage. The control apparatus according to the present invention is provided with a plurality of detecting means, each positioned at a specific point of a control means, for detecting the presence or the absence of information at the specified point and emitting signals reporting the presence or the absence of such information.

It is accordingly the object of this invention to provide a dynamic shift apparatus of simple construction and reliable operation which is free from the above-mentioned drawbacks, eliminates the necessity of using a timing signal generating means for the left shift and provides great adaptability for general application.

SUMMARY OF THE INVENTION

A memory register according to the present invention comprises a dynamic shift memory means including a plurality of shift registers for storing in series a plurality of characters of information; means for detecting at least two consecutive characters of those stored in the dynamic shift memory means; and means for controlling the storing of characters in the dynamic shift memory means and the reading out of characters therefrom in accordance with the prescribed relationship of said at least two consecutive characters detected by the detecting means.

The present invention can be more fully understood from the following detailed description when taken in connection with the accompanying drawings, in which.

Figure 2:
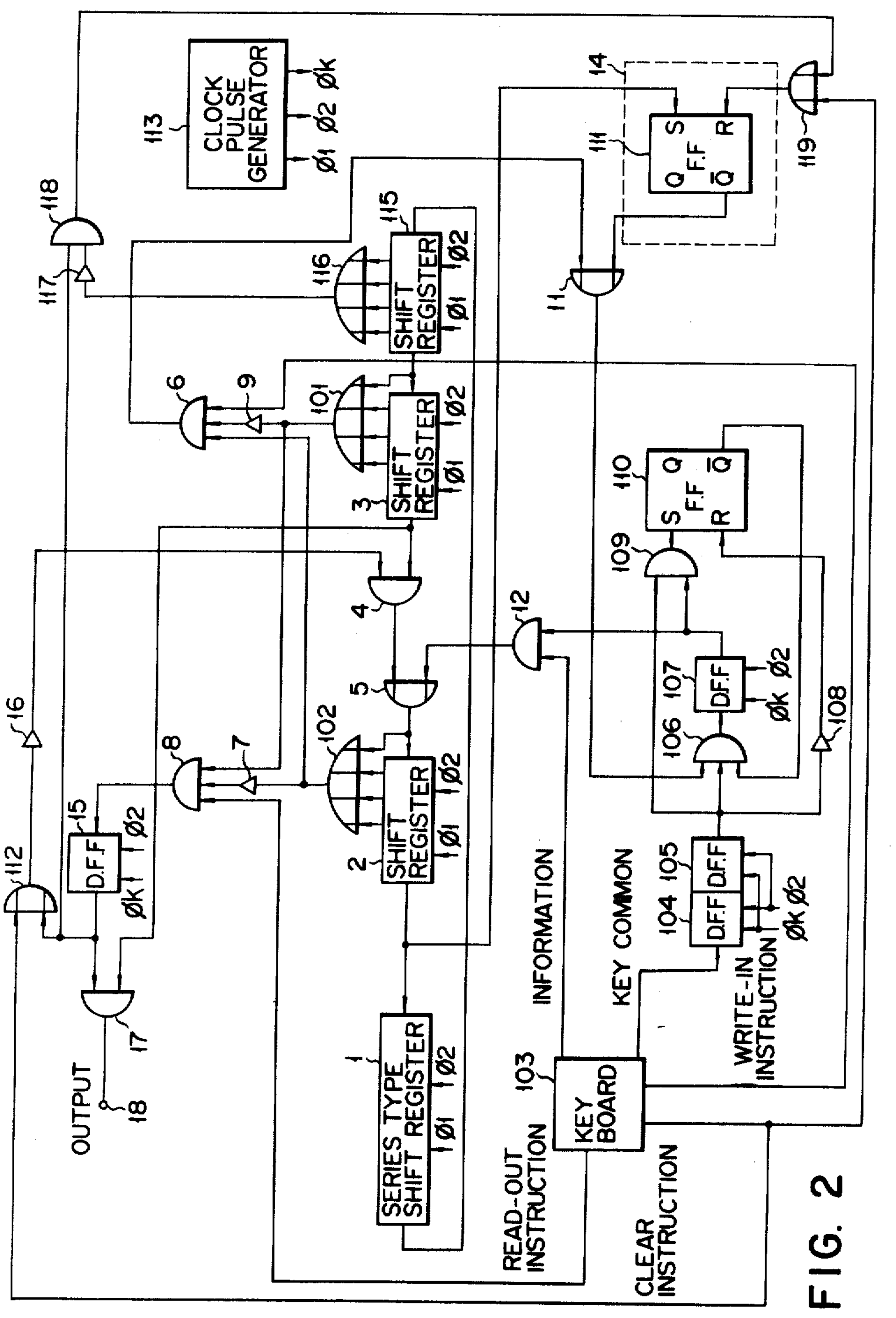
FIG. 2 is a concrete block circuit diagram of a memory register apparatus modified from that of FIG. 1 according to the second embodiment of the invention.
Figure 5A:
Figure 5B:
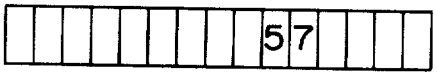
Figure 5C:
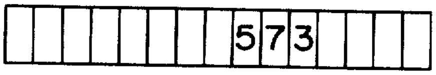
Figure 8:
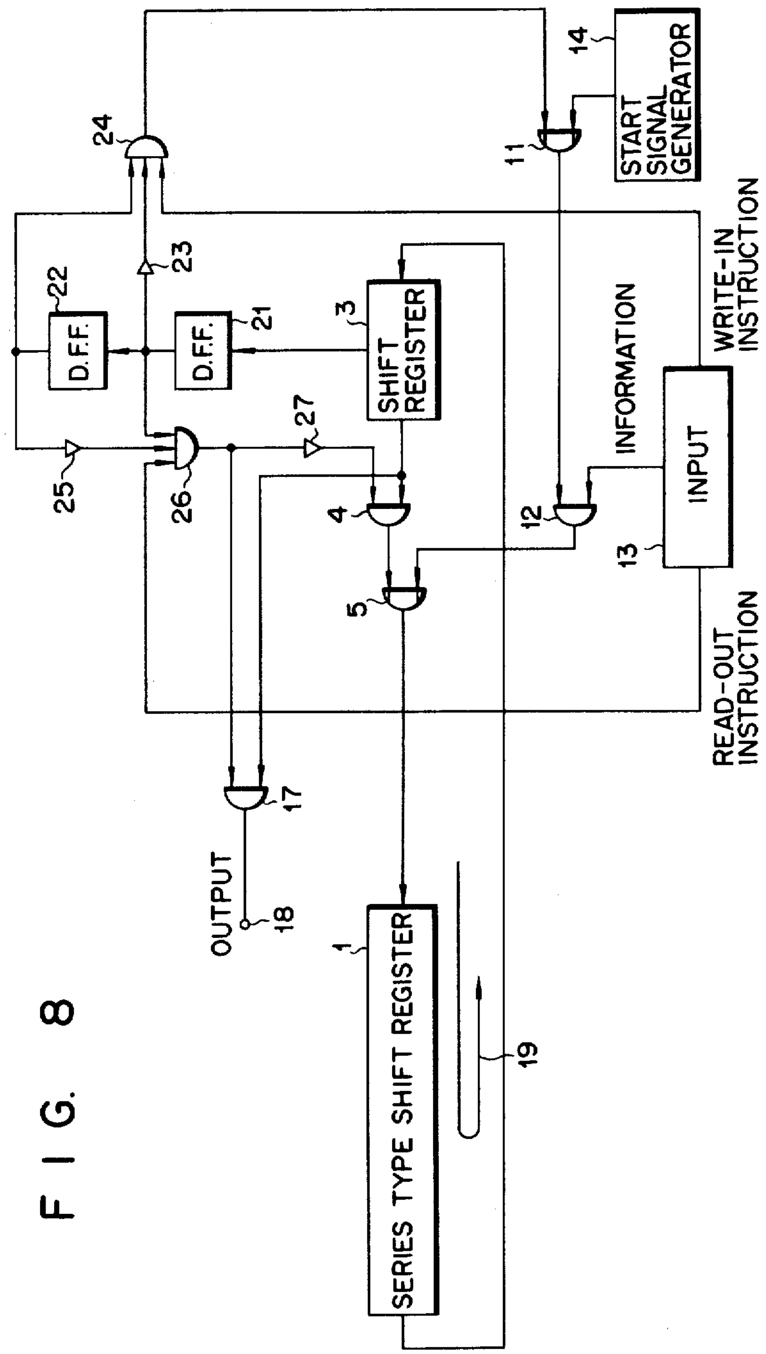
Figure 9:
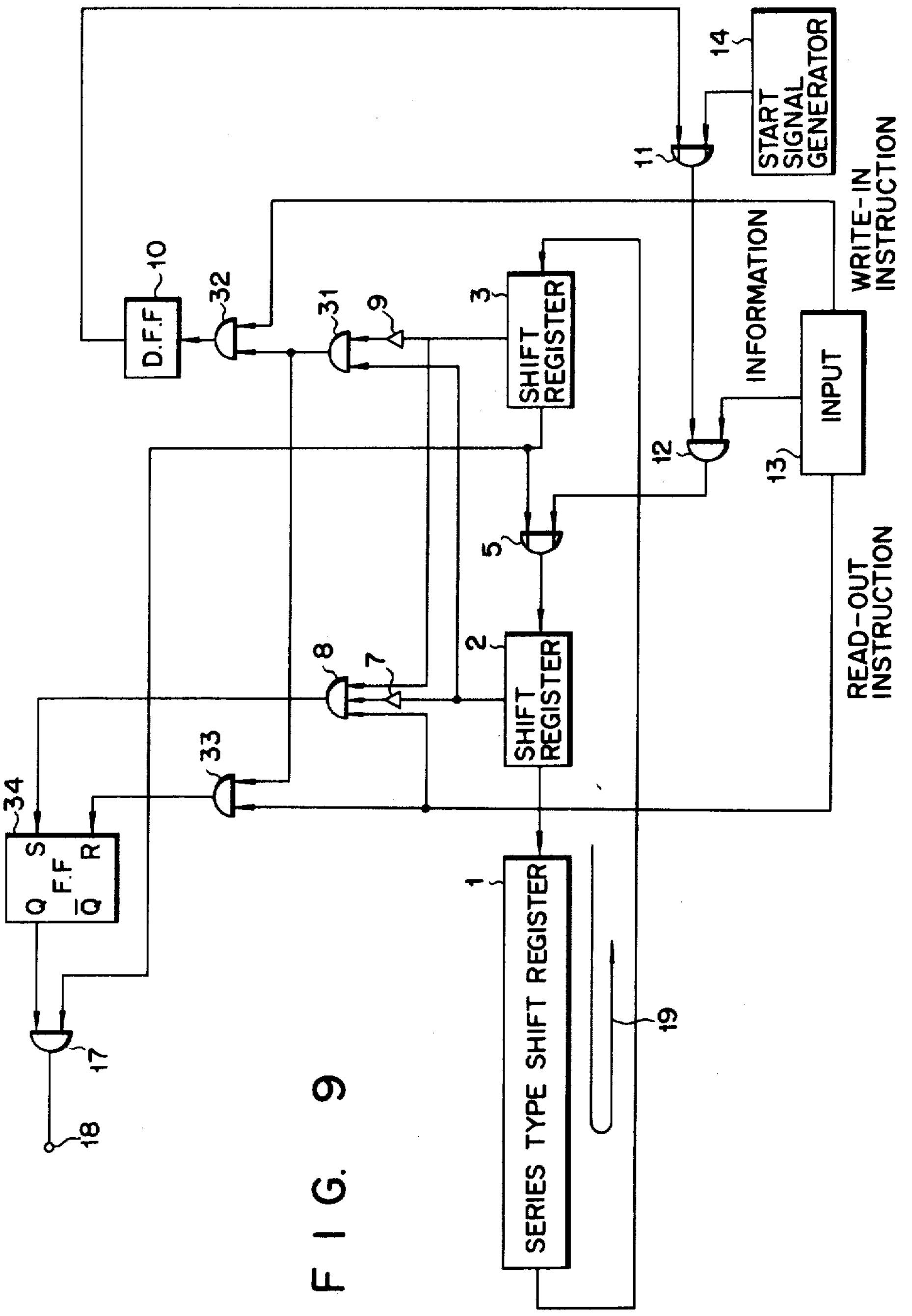
Figure 10:
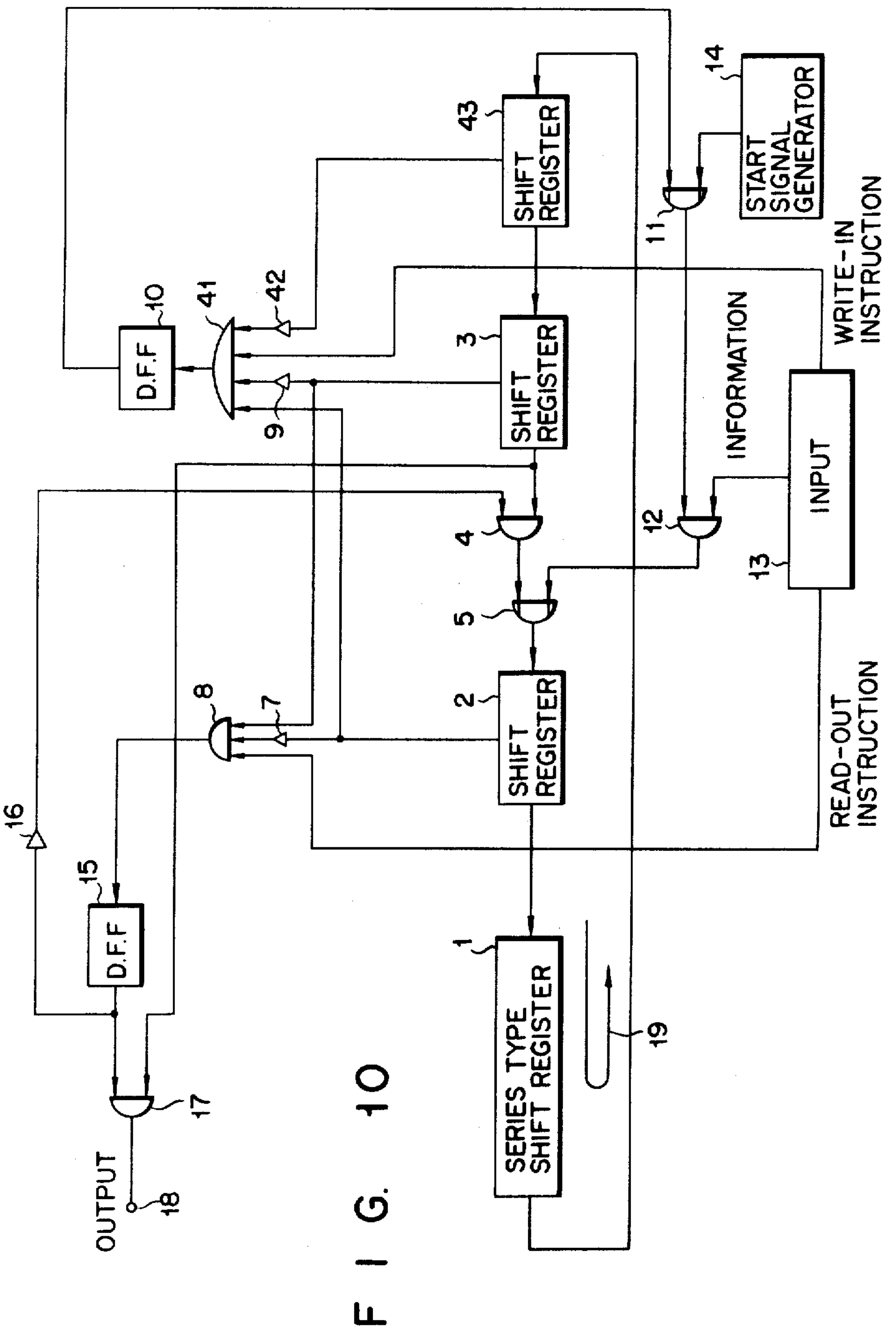

FIGS. 5A to 5C indicate the manner in which characters are stored in the memory register apparatus of FIG. 2 immediately after they are stored therein;

FIGS. 6A to 6M are time charts illustrating the manner in which characters are read out from the memory register apparatus of FIG. 2;

FIGS. 7A to 7D present the manner in which characters are stored in the memory register apparatus of FIG. 2 before they are read out therefrom;

FIG. 8 is a block circuit diagram of a memory register apparatus according to the third embodiment of the invention;

FIG. 9 is a block circuit diagram of a memory register apparatus according to the fourth embodiment of the invention; and FIG. 10 is a block circuit diagram of a memory register apparatus according to the fifth embodiment of the invention.

Figure 1:
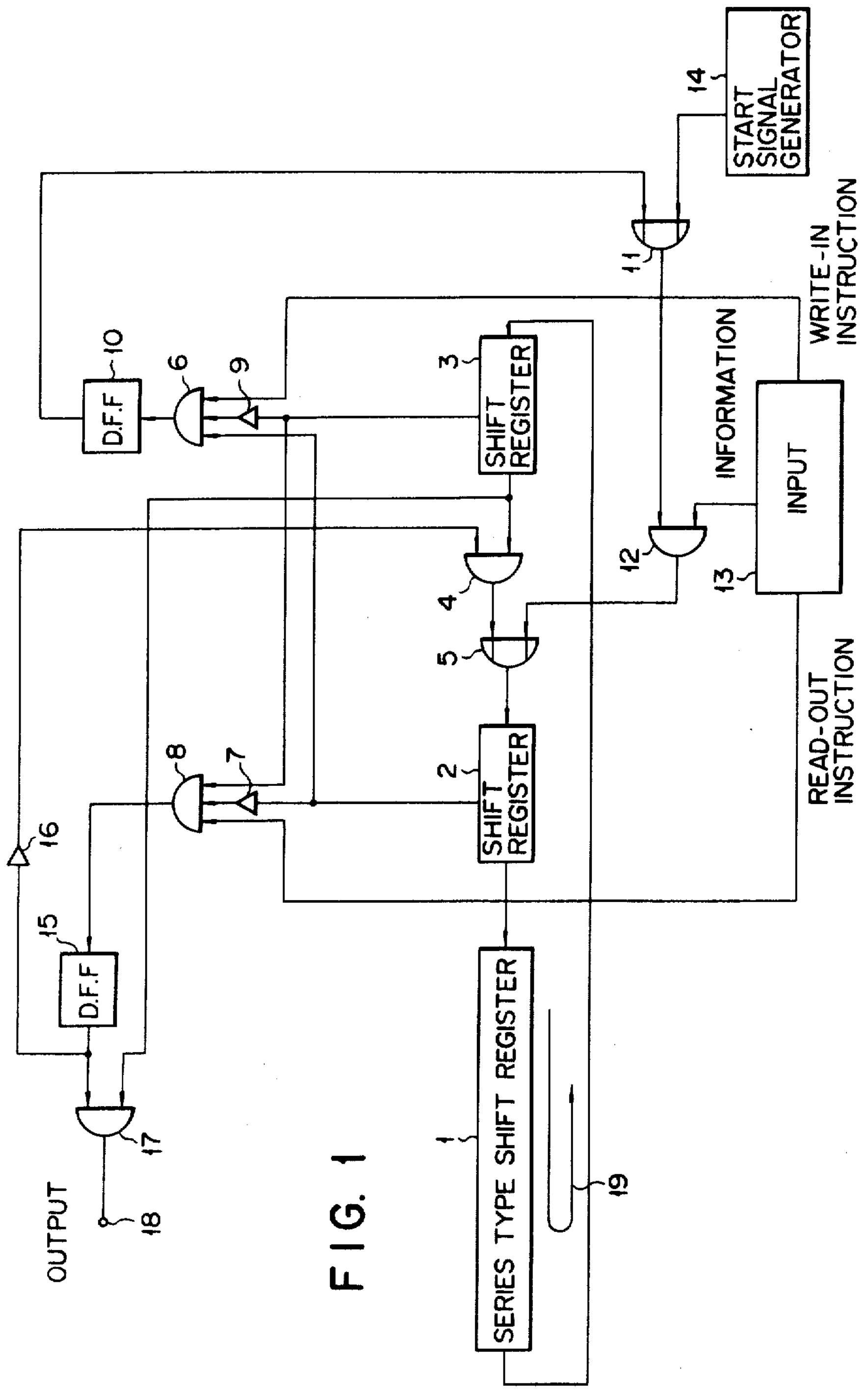
FIG. 1 is a schematic block circuit diagram of a memory register apparatus according to an embodiment of this invention.

Referring to FIG. 1, the series type shift register 1 is a dynamic shift register having a sufficient memory capacity to store in series a desired number of, for example, 12 digits or characters. The output terminal of said dynamic shift register 1 is connected to its own input terminal through a second dynamic shift register 3 and a first dynamic register 2 each having a capacity to store one character. Such shift registers 1, 2 and 3 are well known as exemplified by, for example, U.S. Pat. No. 3,523,284. Information stored in these shift registers 1, 2 and 3 are circulated therethrough in the direction of the indicated arrow 19 by being dynamically shifted. Between the first and second shift registers 2 and 3 are disposed an AND gate 4 and OR gate 5. Though the shift register 1 of the embodiment of FIG. 1 is a series type, it may be a parallel type, if it can store characters in series. The combination of shift registers 1, 2 and 3 is denoted as a dynamic shift memory in this specification and in the claims.

The writing of information consisting of characters in a dynamic shift memory of the above-mentioned arrangement is effected in the following manner. Now let it be assumed that the series type shift register 1, first register 2 and second shift register 3 are cleared of information of left empty. When, under this condition, a start signal generator 14 generates a start signal once for a period of one character, said start signal is conducted through an OR gate 11 to an AND gate 12 to open (i.e., enable) AND gate 12. Accordingly, the first character of information from input means 13 is supplied to the first shift register 2 through the AND gate 12 and OR gate 5 to be eventually stored in the memory shift register 1. Next, the second character of information is supplied from the input means 13 to the AND gate 12. The first character which is to be stored in said dynamic shift register 1 is shifted to the first shift register 2, all the other shift registers are left empty. Accordingly an output of "1" denoting that the first shift register 2 has information stored therein is conducted from the first shift register 2 directly to an AND gate 6. An output of "0" from the second shift register 3 is inverted to that of "1" by an inverter 9 and then supplied to the AND gate 6. Since said AND gate 6 is already supplied with an output of "1" representing a write-in instruction from the input means 13, three inputs to the AND gate 6 all take the form of "1," causing said AND gate 6 to produce an output of "1." The "1" output from the AND gate 6 is supplied to a delayed flip-flop 10, which generates a "1" output for a period of one character time. This "1" output is carried through the OR gate 11 to the AND gate 12, which is thus opened for a period of one character. Accordingly, the succeeding character from input means 13 is stored in the first shift register 2 immediately after the preceding one, the preceding character being shifted to memory register 1. Similarly the third character is stored in the first shift register 2 a period of one character later, while the second character is being stored in the shift register and the second shift register 13 remains empty. Further, a character following the third is stored immediately after the rearmost of a series of characters previously stored in the registers. Thus a plurality of characters are stored in the registers in series.

Reading out of a series of characters thus stored in succession is carried out in the generates manner. A "1" output denoting a read-out instruction is supplied from the input means 13 on the read-out instruction line to an AND gate 8. Let it be assumed that the foremost of a series of characters previously stored in succession is now stored in the second shift register 3, the other succeeding characters remain stored in the series type shift register 1 and the first shift register 2 is empty. At this time, an "0" output from the first register 2 is inverted to "1" by an inverter 7 and supplied to the AND gate 8, and a "1" output from the second shift register 3 is directly conducted to said AND gate 8. Since three inputs to said gate 8 all represent "1," AND gate 8 generates a "1" output and in consequence a delayed flip-flop 15 also generated a "1" output for a period of one character. As a result, an AND gate 17 is opened for a period of one character and during this period, the foremost character stored in the second shift register 3 is supplied to an output terminal 18 through the AND gate 17. A "1" output from the delayed flip-flop 15 is inverted to a "0" output by an inverter 16 and carried to the AND gate 4 to close it. Accordingly, said foremost character is read out and cleared without being conducted to the first shift register 2. When the second character is shifted to the second shift register 3, the first shift register 2 remains empty. Like the foremost character, therefore, the second character is read out from the second shift register 3 and cleared. The remaining characters are similarly read out and cleared, thus completing the read-out of a series of characters stored.

There will now be described the concrete arrangement of a dynamic shift memory according to a second embodiment of this invention modified from that of FIG. 1. Throughout the figures following FIG. 1, the blocks corresponding to those of FIG. 1 are denoted by the same numerals.

Referring to FIG. 2, the dynamic shift memory comprises a series type shift register 1, a first one-character shift register 2, a second one-character shift register 3, and a third one-character shift register 115. All these shift registers are connected in series and the information stored therein is dynamically shifted by a write-in pulse $\phi_2$ or a read-out pulse $\phi_2$ (shown in FIGS. 3A and 3B) produced by a clock pulse generator 113 and circulated in the direction of the indicated arrow. The storing of information in these registers is carried out in the following manner. A keyboard 103 constituting an input device first supplies clear instruction to the AND gate 4 through an OR gate 112 and the inverter 16 to clear the shift registers 1, 2, 3 and 115 of all information stored therein to leave them empty. The clear instruction is carried through an OR gate 119 to the R terminal of a flip-flop 111 to reset it, causing a "1" output to be produced from the $\overline{Q}$ terminal thereof.

Figures 3A, 3B, 3C, 3D, 3E, 3F, 3G, 3H, 3I, 3J, 3K, 3L, 3M:
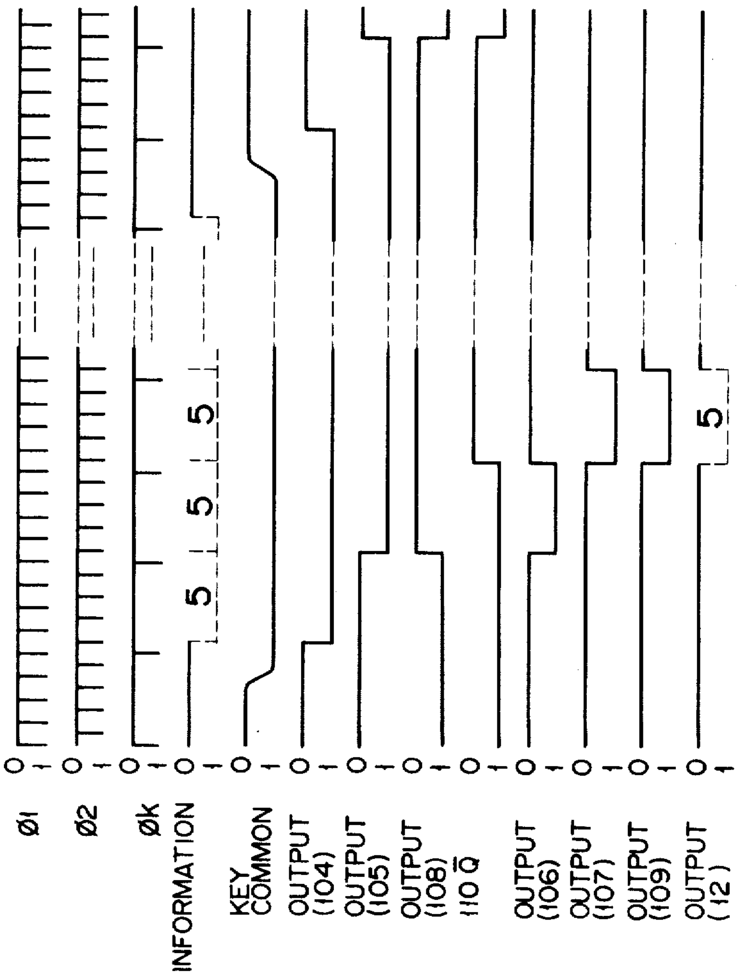
FIGS. 3A to 3M and FIGS. 4A to 4S are time charts illustrating the manner in which characters are stored in the memory register apparatus of FIG. 2.
Figures 4A, 4B, 4C, 4D, 4E, 4F, 4G, 4H, 4I, 4J, 4K, 4L, 4M, 4N, 4P, 4Q, 4R, 4S:
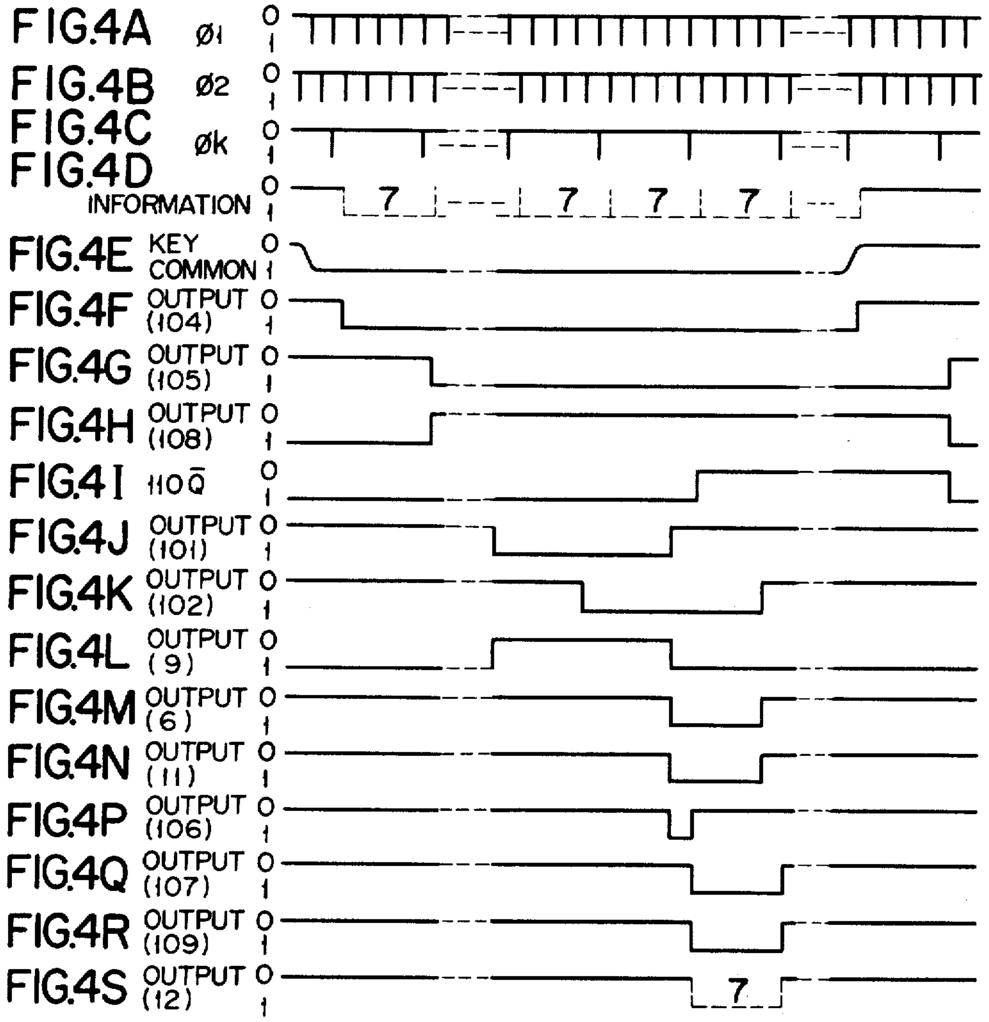

When a given key on the keyboard 103 is depressed, first information (denoting a numeral 5 in this case) is supplied to the AND gate 12 (FIG. 3D). At the same time a key common signal is conducted to a delayed flip-flop 104 (FIG. 3E), which is stored with a "1" input at the timing of a digit pulse $\phi_k$ (FIG. 3C) supplied by the clock pulse generator 113 and generates an output signal (FIG. 3F) upon receipt of the succeeding read-out pulse $\phi_2$. Output from this delayed flip-flop 104 is carried to another flip-flop 105 which delivers an output (FIG. 3G) delayed for a period of one character. Output from the latter delayed flip-flop 105 is inverted by an inverter 108 (FIG. 3H) and supplied to the R terminal of a flip-flop 110, which is already reset by an "1" output from the inverter 108 and produces an "1" output from its $\overline{Q}$ terminal. Further, as previously described, there is supplied an output "1" to the AND gate 106 from the $\overline{Q}$ terminal of a flip-flop 111 through the OR gate 11. Since, at this time, three inputs to the AND gate 106 all take the form of "1," output from said gate 106 also takes the form of "1" (FIG. 3J). As a result the delayed flip-flop 107 supplied with said "1" output delivers an output (FIG. 3K) delayed for a period of one character to open the AND gate 12. Output from said delayed flip-flop 107 is conducted to the AND gate 109, which generates a "1" output (FIG. 3L), because it is already supplied with output from the delayed flip-flop 105. Said "1" output sets the flip-flop 110 and changes the form of output from the $\overline{Q}$ terminal from "1" to "0." Since one of the three inputs to the AND gate 106 takes the form of "0," output from said AND gate 106 also takes the form of "0" (FIG. 3J). Accordingly, the delayed flip-flop 107 produces a "0" output (FIG. 3K) delayed for a period of one character to close the AND gate 12, which is opened, as shown in FIG. 3M, for a period of one character. One character of information (i.e., numeral 5) is stored in the shift register 2 through the OR gate 5 for a period of one character as shown in FIG. 5A.

Where there is depressed a key of, for example, numeral 7 on the keyboard 103, then the numeral 7 information is conducted to the AND gate 12 as shown in FIG. 4D like the numeral 5. At the same time a key common signal (FIG. 4E) is supplied to the delayed flip-flop 104, which consequently delivers a "1"

output. After a period of one character, the delayed flip-flop 105 also produces a "1" output. When the information corresponding to numeral 5 thus stored is shifted from the first shift register 2 to the series type shift register 1, the flip-flop 111 produces a "0" output from its $\overline{Q}$ terminal. When, under this condition, the stored information corresponding to numeral 5 is shifted to the first shift register 2, the OR gate 102 supplies a "1" output (FIG. 4K) to the AND gate 6. Since, at this time, the second shift register 3 remains empty, the OR gate 101 generates a "0" output (FIG. 4J), and in consequence the inverter 9 supplies a "1" output (FIG. 4L) to the AND gate 6. Since, at this time, the AND gate 6 is already supplied with a "1" output representing a write-in instruction by the keyboard 103, three inputs to said AND gate 6 all take the form of "1," causing it to produce a "1" output (FIG. 4M). The "1" output from said AND gate 6 is supplied, as shown in FIG. 4N, to the AND gate 106 through the OR gate 11.

At this time, three inputs to the AND gate 106 all have the form of "1," causing said gate 106 to generate a "1" output (FIG. 4P). The delayed flip-flop 107 also delivers a "1" output (FIG. 4Q) to open the AND gate 12 as shown in FIG. 4S. Upon receipt of a "1" output from the delayed flip-flop 107, the AND gate 109 generates "1" a output (FIG. 4R) to set the flip-flop 110 which delivers a "0" output (FIG. 4I) from its $\overline{Q}$ terminal. As a result, output from the AND gate 106 takes the form of "0" (FIG. 4P) and the delayed flip-flop 107 produces a "1" output for a period of one character said "1" output being later inverted to "0" (FIG. 4Q) to close the AND gate 12 (FIG. 4S). Accordingly, there is stored in the registers character information representing digit 7 immediately after the numeral 5 information previously stored therein (FIG. 5B).

The registers stored, for example, numeral 3 by the same operation as described above. Thus, the dynamic shift memory stores, as shown in FIG. 5C, information corresponding to numerals 5, 7 and 3 in a serial arrangement. The foregoing steps complete the storing of a number 573 in the dynamic shift memory. This number 573 is simply an example. It will be apparent that storing of other numbers consisting of more numerals can be effected in the same manner as in the case of 573.

Figures 6A, 6B, 6C, 6D, 6E, 6F, 6G, 6H, 6I, 6J, 6K, 6L, 6M:
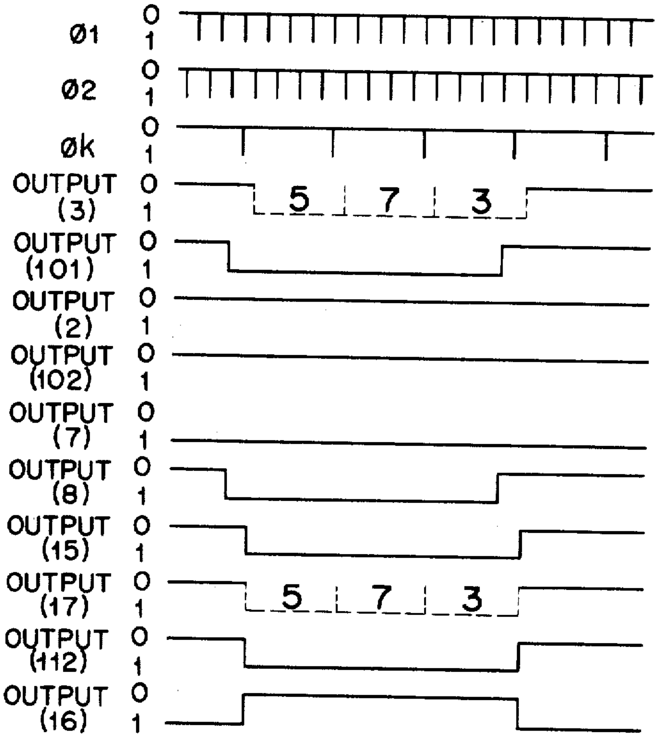
Figure 7A:
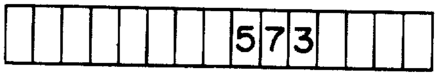

The read-out of the number 573 stored in the registers is carried out by depressing a prescribed key on the keyboard to deliver a read-out instruction. As shown in FIG. 7A, the dynamic memory is stored with three numerals 5, 7 and 3 serially arranged in the order mentioned. When the foremost character representing numeral 5 is shifted to the second shift register 3 (FIG. 6D), the OR gate 101 delivers a "1" output to the AND gate 8 (FIG. 6E). Since, at this time, the first shift register 2 is empty (FIG. 6F), the OR gate 102 produces a "0" output (FIG. 6G), which is inverted to "1" by the inverter 7 (FIG. 6H) and conducted to the AND gate 8. This AND gate 8 is further supplied with a "1" output representing a read-out instruction. At this time, three inputs to said AND gate 8 all take the form of "1," causing said gate 8 to deliver a "1" output (FIG. 6I). As a result, the delayed flip-flop 15 produces a "1" output to open the AND gate 17 (FIG. 6K). As a result, the character information representing 5 is read out from the second shift register 3 to the output terminal 18 thereof. A "1" output from the delayed flip-flop 15 is conducted to the OR gate 12 which in turn generates "1" a output (FIG. 6L). The inverter 16 supplied with said "1" output delivers a "0" output (FIG. 6M) to close the AND gate 4, preventing the information corresponding to numeral 5 from being shifted from the second shift register 3 to the first shift register 2.

Figure 7B:
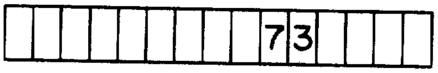
Figure 7C:
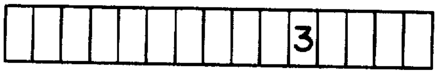
Figure 7D:
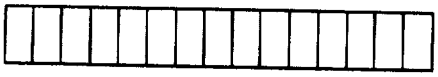

Upon completion of the read-out of the information corresponding to numeral 5, said information is cleared to change the stored content of the memory register to what is shown in FIG. 7B. At this time, the first shift register 2 remains empty, and the second shift register 3 is still stored with the information of the succeeding numeral 7. Accordingly, numeral 7 is read out by the same operation used in reading out the preceding numeral 5 stored in the second shift register 3 with the first shift register 2 left empty. Thus numeral 7 is cleared from the dynamic shift memory (FIG. 7C). Similarly numeral 3 is read out and cleared (FIG. 7D). While numeral 3 is still stored in the second shift register 3, the shift register 115 remains empty. At this time the OR gate 116 produces a "0" output, which is inverted to "1" by the inverter 17 and conducted to an AND gate 118, which is already supplied with a "1" output from the delayed flip-flop and delivers a "1" output to reset the flip-flop 111 through the OR gate 119. Namely, when the information stored in the dynamic shift memory has all been read out to render it empty, the flip-flop 111 constituting the start signal generator 14 delivers a "1" output from its $\overline{Q}$ terminal through the OR gate 119 ready for the succeeding storing operation.

There will now be described a modification (FIG. 8) of the first embodiment of FIG. 1. The dynamic shift memory of FIG. 8 has the same function as that of FIG. 1. The information corresponding to the first character is stored in the dynamic shift memory of FIG. 8 in the same way as in that of FIG. 1. The second and subsequent characters are stored as described below. While the rearmost of a series of characters already stored is stored in a one-character shift register 3, a delayed flip-flop 21 delivers a "1" output for a period of one character. After a one-character period, the aforesaid rearmost character is shifted to the series type shift register 1 with the one-character shift register 3 left empty. At this time, a delayed flip-flop 21 generates a "0" output, whereas a delayed flip-flop 22 produces a "1" output for a period of one character. The "0" output from the former delayed flip-flop 21 is inverted to "1" by an inverter 23 and then conducted to an AND gate 24. The "1" output from the latter delayed flip-flop 22 is directly supplied to the AND gate 24. Output from the former delayed flip-flop 21 corresponds to the information currently stored in the shift register 3 for a period of one character, and output from the latter delayed flip-flop 22 corresponds to the information stored in the shift register a one-character period before. At this time the AND gate 24 is supplied with a "1" output representing write-in instruction from the input means 13 and delivers a "1" output, which is conducted through the OR gate 11 to the AND gate 12 to open it. As a result, the information corresponding to one character from the input means 13 is supplied to the series type shift register 1 through the OR gate 5. Said character information is then stored in succession behind a series of already stored characters. Thereafter a read-out instruction from the input means 13 is delivered to an AND gate 26. Reading of stored information is carried out in the following manner. When the foremost of a series of characters already stored in succession is shifted to the shift register 3, the delayed flip-flop 21 produces a "1" output during the same one-character period. At this time, the delayed flip-flop 22 still continues to deliver a "0" output, which is inverted to "1" by an inverter 25 and conducted to the AND gate 26. Since the "1" output from the delayed flip-flop 21 is directly supplied to the AND gate 26, three inputs to said gate 26 all take the form of "1," causing said gate 26 to deliver a "1" output to open the AND gate 17 for a period of one character. Accordingly, the one character information stored in the shift register 3 is read out from the output terminal 18. The "1" output from the AND gate 26 is inverted to "0" by an inverter 27 to close the AND gate 4, and prevent information to be transferred from the shift register 3 to the series type shift register 1, thus clearing the one-character information stored in the shift register 3. Thus the foremost of a series of characters already stored is cleared to bring the second character to the foremost position. Said second character is read out and cleared. Repetition of this operation completes the sequential reading out of a series of characters.

FIG. 9 shows the schematic circuit arrangement of a dynamic shift memory device according to a fourth embodiment of this invention. Storing of information in this dynamic shift memory is carried out in the same way as in FIGS. 2 and 8, and description thereof is omitted. Reading out of information stored in said memory register is effected in the following manner. When the foremost of a series of characters stored in the series type shift register 1 is shifted to the second one character shift register 3, a "1" output from said shift register 3 is supplied to the AND gate 8, with the first one-character shift register 2 left empty. Accordingly, a "0" output from the first shift register 2 is inverted by the inverter 7 to a "1" signal, which is supplied to the AND gate 8. Since this AND gate 8 is already supplied with read-out instruction from the input means 13, it generates a "1" output to set a flip-flop 34, which in turn delivers a "1" output from its Q terminal to open the AND gate 17. Thus a series of characters stored in the registers are read out from the output terminal 18, starting with the foremost one. Unlike the preceding embodiments, that of FIG. 9 does not cause read out characters to be cleared. When the rearmost character is shifted to the first shift register 2, it delivers a "1" output to an AND gate 31. At this time, the second shift register 3 is left empty and delivers a "0" output to an inverter 9 which inverts the "0" output to a "1" signal and supplies it to the AND gate 31. This AND gate 31 delivers a "1" output to an AND gate 33, which is already supplied with a "1" output representing a read-out instruction and generates a "1" output to reset the flip-flop 34. Accordingly, the "1" output from the Q terminal of said flip-flop 34 is inverted to a "0" signal, which is conducted to the AND gate to close it. Thus a series of characters already stored in the registers are read out, starting with the foremost one. When the rearmost character is read out, the AND gate 17 is closed to bring reading operation to an end. In this case, the read out characters are not cleared, but kept circulating in a state stored in the dynamic shift memory.

FIG. 10 shows the schematic circuit arrangement of a dynamic shift memory according to a fifth embodiment of this invention. Reading out of information stored in this dynamic shift memory is carried out in the same manner as in the first embodiment of FIG. 1 and description thereof is omitted. Storing of information in the dynamic shift memory of FIG. 10 is effected in the following way. The input means 13 supplies a "1" output representing write-in instruction to an AND gate 41. The first character is stored, as in the other embodiments, upon receipt of a start signal from the start signal generator 14. The second character is stored as described below. When the foremost character already written is shifted to the first one-character shift register 2, the second and third one-character shift registers 3 and 43 remain empty. At this time, the first one-character shift register 2 delivers a "1" output to the AND gate 41. The second and third one-character shift registers 3 and 43 deliver a "0" output to the inverters 9 and 42, which in turn supply a "1" output to the AND gate 41. As a result, the AND gate 41 produces a "1" output and in consequence the delayed flip-flop 10 also generates a "1" output for a period of one character. Said "1" output is supplied through the OR gate 11 to the AND gate 12 to open it for a one-character period. Accordingly, the information corresponding to the second character from the input means 13 is stored in the first shift register 2 through the AND gate 12 and OR gate 5. The first and second characters are stored in series. Thus storing of characters is carried out in succession. Now let it be assumed that a dynamic shift memory consisting of the series type shift register 1 and first, second and third one-character shift registers 2, 3 and 43 has a capacity of storing, for example, 12 characters. When 11 characters are stored in said 12-character memory register, said register still has a vacant space for one more character. When the rearmost of the 11 characters is stored in the first one-character shift register 2, the second one-character shift register 3 remains empty and the third one-character shift register 43 is stored with the foremost character. Accordingly the first shift register 2 supplies a "1" output to the AND gate 41, the second shift register 3 a "0" output to the inverter 9 and the third shift register 43 a "1" output to an inverter 42. Thus the AND gate 41 produces a "0" output and the delayed flip-flop 10 also generates a "0" output to keep the AND gate 12 closed, preventing the writing storing of any character. A dynamic shift memory according to the fifth embodiment of FIG. 10, does not carry out storage of characters up to its memory capacity, and never fails to have a vacant space for one more character. Therefore, there always occurs the condition in which the first one-character shift register 2 produces a "0" output and the second one-digit shift register 3 generates a "1" output, thus enabling a reading out operation to be carried out reliably.

While the examples have been given in connection with characters, the concept is equally applicable in connection with digits.

What is claimed is:

1. Apparatus for controlling character information storage comprising:

a dynamic shift memory means for circulatingly shifting a plurality of characters of information to store said characters of information in series, said dynamic shift memory means including a plurality of serially connected memory units, some of said serially connected memory units selectively storing one character of information;

signifying means for generating a first signal signifying that character information is to be stored in said dynamic shift memory means, and a second signal signifying that character information is to be read out from said dynamic shift memory means;

an input gate connected to said dynamic shift memory means for receiving input characters of information to be stored in said dynamic shift memory means;

sensing means coupled to a pair of memory units for sensing that no information is stored in at least one unit of said pair of memory units and generating an output signal denoting when no information is stored in at least one unit of said pair of memory units;

means for opening said input gate in response to said first signal emitted from said signifying means and also in response to said output signal from said sensing means denoting the condition when no character information is stored in said at least one unit of said pair of memory units, thereby enabling storing of a character of information in said dynamic shift memory means through said input gate;

an output gate coupled to said dynamic shift memory means;

said sensing means further including means for sensing that a character of information is stored in said at least one unit of said pair of memory units and that a character of information is not stored in the other unit of said pair of memory units, and for generating a second output signal responsive to this condition;

means for opening said output gate for reading out information from said output of said dynamic shift memory means responsive to said second signal from said signifying means and said second output of said sensing means; and gate means coupled to said means for opening said output gate and to the output of said dynamic shift memory means and responsive to said means for opening said output gate for preventing the characters being read out from being re-stored in said dynamic shift memory means, thereby extinguishing characters when they are read out.

2. Apparatus for controlling character information storage according to claim 1 wherein said input gate is interposed between a pair of said memory units for receiving character information to be stored in said dynamic shift memory means.

3. Apparatus for controlling character information storage according to claim 1, further comprising:

further sensing means for detecting the absence of character information in said dynamic shift memory means; and means responsive to said further sensing means for storing the initial (or first) character information in said dynamic shift memory means via said input gate when said further sensing means detects the absence of character information in said dynamic shift memory means.

4. Apparatus for controlling character information storage according to claim 3 further comprising: means for detecting via an AND gate the absence of character information in a memory unit connected serially to said pair of memory units.

5. Apparatus for controlling character information storage according to claim 1 further comprising:

a further memory unit serially connected with said pair of memory units; and means coupled with said pair of memory units and said further memory unit for detecting the presence of character information in said further memory unit.

6. Apparatus for controlling character information storage comprising:

a dynamic shift memory means for circulatingly shifting a plurality of characters of information to store said characters of information in series, said dynamic shift memory means including a plurality of serially connected memory units, some of said serially connected memory units selectively storing one character of information;

signifying means for generating a first signal signifying that character information is to be stored in said dynamic shift memory means, and a second signal signifying that character information is to be read out from said dynamic shift memory means;

an input gate connected to said dynamic shift memory means for receiving input characters of information to be stored in said dynamic shift memory means;

sensing means coupled to a pair of memory units for sensing that no information is stored in at least one unit of said pair of memory units and generating an output signal denoting when no information is stored in at least one unit of said pair of memory units;

means for opening said input gate in response to said first signal emitted from said signifying means and also in response to said output signal from said sensing means denoting the condition when no character information is stored in said at least one unit of said pair of memory units, thereby enabling storing of a character of information in said dynamic shift memory means through said input gate;

an output gate coupled to said dynamic shift memory means;

said sensing means further including means for sensing that a character of information is stored in said at least one unit of said pair of memory units and that a character of information is not stored in the other unit of said pair of memory units, and for generating a second output signal responsive to this condition; and means for opening said output gate for reading out information from said output of said dynamic shift memory means responsive to said second signal from said signifying means and said second output of said sensing means.

7. Apparatus for controlling character information storage according to claim 6 wherein said input gate is interposed between a pair of said memory units for receiving character information to be stored in said dynamic shift memory means.

8. Apparatus for controlling character information storage according to claim 6, further comprising:

further sensing means for detecting the absence of character information in said dynamic shift memory means; and means responsive to said further sensing means for storing the initial (or first) character information in said dynamic shift memory means via said input gate when said further sensing means detects the absence of character information in said dynamic shift memory means.

9. Apparatus for controlling character information storage according to claim 6 further comprising:

a further memory unit serially connected with said pair of memory units; and means coupled with said pair of memory units and said further memory unit for detecting the presence of character information in said further memory unit.

10. Apparatus for controlling character information storage comprising:

a dynamic shift memory means for circulatingly shifting a plurality of characters of information to store said characters of information in series, said dynamic shift memory means including a plurality of serially connected memory units, some of said serially connected memory units selectively storing one character of information;

signifying means for generating a first signal signifying that character information is to be stored in said dynamic shift memory means;

an input gate connected to said dynamic shift memory means for receiving input characters of information to be stored in said dynamic shift memory means;

sensing means coupled to a pair of memory units for sensing that no information is stored in at least one unit of said pair of memory units and generating an output signal denoting when no information is stored in at least one unit of said pair of memory units; and means for opening said input gate in response to said first signal emitted from said signifying means and also in response to said output signal from said sensing means denoting the condition when no character information is stored in said at least one unit of said pair of memory units, thereby enabling storing of a character of information in said dynamic shift memory means through said input gate.

11. Apparatus for controlling character information storage according to claim 10 wherein said input gate is interposed between a pair of said memory units for receiving character information to be stored in said dynamic shift memory means.

12. Apparatus for controlling character information storage according to claim 10, further comprising:

further sensing means for detecting the absence of character information in said dynamic shift memory means; and means responsive to said further sensing means for storing the initial (or first) character information in said dynamic shift memory means via said input gate when said further sensing means detects the absence of character information in said dynamic shift memory means.

13. Apparatus for controlling character information storage according to claim 10 further comprising:

a further memory unit serially connected with said pair of memory units; and means coupled with said pair of memory units and said further memory unit for detecting the presence of character information in said further memory unit.

14. Apparatus for controlling character information storage comprising:

a dynamic shift memory means for circulatingly shifting a plurality of characters of information to store said characters of information in series, said dynamic shift memory means including a plurality of serially connected memory units, some of said serially connected memory units selectively storing one character of information;

signifying means for generating a signal signifying that character information is to be read our from said dynamic shift memory means;

sensing means coupled to a pair of memory units for sensing that information is stored in at least one unit of said pair of memory units and generating an output signal denoting when information is stored in at least one unit of said pair of memory units;

an output gate coupled to said dynamic shift memory means;

means for opening said output gate for reading out information from said output of said dynamic shift memory means responsive to said signal from said signifying means and said output signal of said sensing means; and gate means coupled to said means for opening said output gate and to the output of said dynamic shift memory means and responsive to said means for opening said output gate for preventing the characters being read out from being re-stored, thereby extinguishing characters when they are read out.

15. Apparatus for controlling character information storage according to claim 14 further comprising means for detecting via an AND gate the absence of character information in a memory unit connected serially to said pair of memory units.

16. Apparatus for controlling character information storage comprising:

a dynamic shift memory means for circulatingly shifting a plurality of characters of information to store said characters of information in series, said dynamic shift memory means including a plurality of serially connected memory units, some of said serially connected memory units selectively storing one character of information;

signifying means for generating a signal signifying that character information is to be read out from said dynamic shift memory means;

sensing means coupled to a pair of memory units for sensing that information is stored in at least one unit of said pair of memory units and generating an output signal denoting when information is stored in at least one unit of said pair of memory units;

an output gate coupled to said dynamic shift memory means; and means for opening said output gate for reading out information from said output of said dynamic shift memory means responsive to said signal from said signifying means and said output signal of said sensing means.

* * * * *